(12) United States Patent
Wang et al.

(10) Patent No.: US 12,024,648 B2
(45) Date of Patent: Jul. 2, 2024

(54) GRAPHENE ANTI-CORROSION COATING

(71) Applicant: Toray Industries, Inc., Tokyo (JP)

(72) Inventors: Ke Wang, Shanghai (CN); Yang Yang, Shanghai (CN); Qiao Chen, Shanghai (CN); Manabu Kawasaki, Shanghai (CN)

(73) Assignee: Toray Industries, Inc., Tokyo (JP)

(*) Notice: Subject to any disclaimer, the term of this patent is extended or adjusted under 35 U.S.C. 154(b) by 531 days.

(21) Appl. No.: 17/292,745

(22) PCT Filed: Nov. 28, 2019

(86) PCT No.: PCT/CN2019/121478
§ 371 (c)(1),
(2) Date: May 11, 2021

(87) PCT Pub. No.: WO2020/108552
PCT Pub. Date: Jun. 4, 2020

(65) Prior Publication Data
US 2021/0395536 A1    Dec. 23, 2021

(30) Foreign Application Priority Data

Nov. 29, 2018 (CN) .......................... 201811440849.5

(51) Int. Cl.
*C09D 5/08* (2006.01)
*C09D 7/62* (2018.01)
*C09D 163/00* (2006.01)

(52) U.S. Cl.
CPC ............... *C09D 5/084* (2013.01); *C09D 7/62* (2018.01); *C09D 163/00* (2013.01)

(58) Field of Classification Search
None
See application file for complete search history.

(56) References Cited

U.S. PATENT DOCUMENTS

| | | |
|---|---|---|
| 10,199,654 B2 | 2/2019 | Du et al. |
| 2017/0349763 A1 | 12/2017 | Wu et al. |
| 2018/0261402 A1* | 9/2018 | Manabe ................ H01M 4/625 |

FOREIGN PATENT DOCUMENTS

| | | | |
|---|---|---|---|
| CN | 104852051 A | 8/2015 | |
| CN | 105623471 A | 6/2016 | |
| CN | 105905887 A | 8/2016 | |
| CN | 107459906 A | 12/2017 | |
| CN | 107739566 A | 2/2018 | |
| CN | 108384406 A | 8/2018 | |
| CN | 108395804 A | 8/2018 | |
| CN | 108546496 A | 9/2018 | |
| CN | 107815216 A | 3/2020 | |
| WO | WO-2017047521 A1 * | 3/2017 | .......... B01J 13/0026 |

OTHER PUBLICATIONS

Novoselov, K.S. et al., "Electric field effect in atomically thin carbon films", Science, 306, 666-669, Oct. 22, 2004.

International Search Report and Written Opinion for International Application No. PCT/CN2019/121478, dated Feb. 24, 2020, 6 pages.

* cited by examiner

*Primary Examiner* — Tanisha Diggs
(74) *Attorney, Agent, or Firm* — Buchanan Ingersoll & Rooney PC

(57) ABSTRACT

A graphene anti-corrosion coating is described that comprises an epoxy resin and graphene subjected to surface modification, where the addition amount of the graphene is 0.01-0.2 wt % of the total mass of coating solid. By performing surface treatment on the graphene, the dispersity of the graphene in the coating is improved, and the compactness of the coating is enhanced.

8 Claims, No Drawings

GRAPHENE ANTI-CORROSION COATING

CROSS REFERENCE TO RELATED APPLICATIONS

This is the U.S. National Phase application of PCT/CN2019/121478, filed Nov. 28, 2019, which claims priority to Chinese Patent Application No. 201811440849.5, filed Nov. 29, 2018, the disclosures of these applications being incorporated herein by reference in their entireties for all purposes.

FIELD OF THE INVENTION

The present invention belongs to the field of chemical coatings, and more particularly relates to a high-performance anti-corrosion coating only containing low content of modified graphene.

BACKGROUND OF THE INVENTION

Nowadays, corrosion and rust cause a lot of inconvenience to people's lives, resulting in a large quantity of loss and waste in energy and resources, thereby bringing huge economic losses to countries every year. According to reports published by the United States, Japan, Canada and other countries, the direct economic loss caused by corrosion alone accounts for about 1%-4% of the total national economic output each year, and corroded and rusted steel accounts for about 20% of the annual output. In China, the annual economic loss caused by metal corrosion accounts for about 4% of the GDP, and the corrosion loss even exceeds the total loss caused by fire, wind and earthquake. Such an astonishing loss has made people's urgent demand for high-performance anti-corrosion coatings increasing.

Since graphene was discovered in the laboratory by Konstantin Novoselov and Andre Geim of the University of Manchester in 2004 by the micromechanical exfoliation method (Novoselov, K. S. & Geim, A. K. et al. Electric field effect in atomically thin carbon films. Science, 306, 666-669, 2004), its excellent mechanical, electrical and thermal properties have attracted by material scientists. Graphene is a flat two-dimensional thin film material which has hexagonal honeycomb lattices composed of carbon atoms in $sp^2$ hybrid orbitals and has a thickness of only one carbon atom, and is a basic unit to construct zero-dimensional fullerenes, one-dimensional carbon nanotubes and three-dimensional graphite. Graphene is the thinnest nanomaterial by far, and its applications in coatings and other fields is gradually attracting public attention because of its excellent mechanical properties (tensile strength of 130 GPa, Young's modulus of up to 1 TPa), outstanding electrical conductivity (conductivity of $10 \, S \cdot m^{-1}$), ultra-high aspect ratio, etc. However, when graphene is added as a filler to an anti-corrosion coating, it is difficult to achieve good dispersion due to its high specific surface area, as well as water-insoluble and oil-insoluble characteristics. If the dispersion effect is not good and agglomeration is formed, graphene cannot improve the mechanical properties and anti-corrosion properties of the anti-corrosion coating itself, but produces pores on a paint film of the coating and forms a corrosion circuit with a corrosive medium and a base metal plate to accelerate the corrosion. In addition, high-quality graphene itself is expensive; and how to control the addition amount of the graphene, improve the dispersion of the graphene, and obtain a high-performance graphene anti-corrosion coating is a difficulty at the current stage.

Patent document 1 discloses a graphene anti-corrosion coating. In order to change the defect that the salt spray resistance time of a coating prepared by a traditional method is too short, graphene is added to a traditional zinc-rich coating, which improves the adhesion, hardness and barrier properties of the coating and prolong the salt spray resistance time of the coating by using the characteristics, such as high strength and high barrier properties of the graphene itself. However, in this method, the graphene is not subjected to surface treatment, such that the graphene is prone to agglomeration due to its own characteristics and is difficult to disperse uniformly in epoxy resin as a substrate. In this case, the added graphene may form agglomerated particles in the coating, resulting in void defects in the coating and affecting the performances of the coating.

Patent Document 2 proposes a solution in which graphene is treated by TEMPO catalytic oxidation and applied to anti-corrosion coatings. The modified graphene has a good dispersion effect in the coatings, and the anti-corrosion time of the coatings is prolonged to a certain degree. However, the content of graphene used in the embodiments of Patent Document 2 is excessively high. In several sets of embodiments, the addition amount of graphene even exceeds 1 wt %. Currently, since the price of graphene on the market is relatively high, such an addition amount will significantly increase the cost of anti-corrosion coatings.

PATENT DOCUMENTS

Patent document 1: CN 105623471A
Patent document 2: CN 107739566A

SUMMARY OF THE INVENTION

In order to solve the above problems, the inventors have found through in-depth researches that a chemical bonding force can be introduced between graphene and epoxy resin, by modifying the graphene by using a surface treating agent and adding the modified graphene at a low content to an anti-corrosion coating containing the epoxy resin as a substrate, thereby improving the dispersity of the graphene in the anti-corrosion coating, enhancing the compactness of the coating, and obtaining a low-cost graphene anti-corrosion coating with excellent barrier properties, electrical conductivity, mechanical strength, anti-corrosion, and the like. That is, the present invention specifically provides a graphene anti-corrosion coating, comprising an epoxy resin and graphene, wherein the graphene is modified by a surface treating agent. The addition amount of the graphene is only 0.01-0.2 wt % of the total mass of coating solid. The so-called total mass of the coating solid refers to the mass of a film formed after the coating is dried.

<Epoxy Resin>

The epoxy resin used as the substrate in the anti-corrosion coating of the present invention is not particularly limited as long as it is an epoxy resin commonly used in anti-corrosion coatings. Preferable epoxy resin is selected from the group of E-51, E-44, E-20, E-12 and E-06 and one or more of epoxy resin(s) can be used.

<Modified Graphene>

The graphene anti-corrosion coating of the present invention comprises the above-mentioned epoxy resin and modified graphene. The graphene is modified by a surface treating agent. The content of the graphene is only 0.01-0.2 wt % of the total mass of the coating solid. If the addition amount of the graphene is less than 0.01 wt %, it means that the content is too low, which is not enough to exert the barrier effect of the graphene, and also unable to form a conductive path in the coating system to increase a utilization rate of zinc powder. If the addition amount of the graphene exceeds 0.2 wt %, it means that the content is too high, which makes the graphene easily agglomerate and concentrate locally in the coating system to form pores, thereby resulting in a decrease in the overall performance of the coating.

The addition amount of the graphene is preferably 0.02 wt % or more, further preferably 0.03 wt % or more. Meanwhile, the addition amount of the graphene is preferably 0.1 wt % or less, further preferably 0.05 wt % or less.

The graphene used in the present invention is not particularly limited as long as its median diameter (D50) is within a range that does not impair the effects of the present invention, but is preferably 30 μm or less.

The graphene used in the present invention is not particularly limited as long as its thickness is within a range that does not impair the effects of the present invention, but is preferably 2-12 nm. The thickness of the graphene can be measured by an atomic force microscope (AFMV), by using a J scanner $Si_3N_4$ needle to scan in a contact mode at a frequency of 1.0-2.4 Hz. A pretreatment method for graphene test is as follows: using N-methylpyrrolidone (NMP) as a solvent, dispersing graphene in the solvent to prepare a 0.002 wt % dispersion liquid, dropping the dispersion liquid on a mica sheet, drying and then performing AFM measurement.

The graphene used in the present invention is not particularly limited as long as its diameter in D90/D50 is within a range that does not impair the effects of the present invention, but is preferably 2 or less. The diameters of the graphene in D50 and D90 are measured by a volume reference mode of particle size distribution test.

In the present invention, the above-mentioned modified graphene is obtained by reducing graphite oxide treated with a surface treating agent. The surface of the modified graphene contains functional groups that can react with epoxy groups in the epoxy resin. After the reaction, carbon-nitrogen chemical bonding is formed between the graphene and the epoxy resin, which improves a bonding force between the graphene and the resin. The characteristic peaks of the carbon-nitrogen chemical bond structure can be observed in a range of 1000-1300 cm-1 within an infrared spectrum.

In the present invention, in order to obtain a better effect, it is preferable to use a surface treating agent containing a nitrogen element.

Specifically, one or more of arylaminos, pyrazolones, and catechols can be enumerated as the surface treating agent.

One or more of o-chloroaniline, p-chloroaniline, o-toluidine, acetanilide, 2-aminobenzylamine, p-methoxyaniline, 2-nitroaniline, 2-phenylethylamine hydrochloride and 4,4'-diaminodiphenylmethane, preferably 2-aminobenzylamine, 2-phenylethylamine hydrochloride and 4,4'-diaminodiphenylmethane, can be enumerated as the arylaminos-based surface treating agent.

One or more of 1-phenyl-3-methyl-4-benzoyl-5-pyrazolone, bispyrazolone, picric acid, 1-phenyl-3-methyl-5-pyrazolone, preferably bispyrazolone, can be enumerated as the pyrazolones-based surface treating agent.

Catechol borane, pyrocatechol violet, 3,5-di-tert-butyl-1,2-benzenediol, 4-nitrocatechol and dopamine hydrochloride, preferably dopamine hydrochloride, can be enumerated as the catechols-based surface treating agent.

In the present invention, the method for graphene surface modification can be carried out by high temperature reflux reaction, normal temperature and normal pressure blending reaction, and the like.

Further, as the reduction of the graphite oxide treated with the surface treating agent, a thermal reduction process or a method using hydrazine hydrate, dithionite or the like as a reducing agent, etc. can be used for reduction. Preferably, dithionite is used as a reducing agent for reduction. In order to prevent graphene sheets from curling, agglomerating or falling off, it is preferable to make the above reduction reaction proceed gently at a low temperature of 0-50° C.

In view of the operability, cost, dispersibility, and conductivity, it is preferable that an atomic ratio of oxygen element to carbon element in the modified graphene of the present invention is 0.05-0.4, and further, the lower limit is preferably 0.1, and the upper limit is preferably 0.25. If the O/C ratio is too low, the physical properties of the modified graphene tend to be close to those of graphene, and the dispersibility is relatively poor; and if the O/C ratio is too high, the resistivity of the modified graphene tends to be too high, zinc powder cannot be fully utilized, and the salt spray resistance time of the coating cannot achieve particularly excellent effects.

In view of a grafting rate of the surface treating agent and the dispersity of the modified graphene, it is preferable that an atomic ratio of nitrogen element to carbon element in the modified graphene of the present invention is 0.01-0.05, and further, the lower limit is preferably 0.015, and the upper limit is preferably 0.03. If the N/C ratio is too low, functional groups that tend to be grafted cannot achieve an expected dispersion effect; and if the N/C ratio is too high, too many functional groups are grafted, which tends to cause cross-linking between modified graphene, resulting in a decrease in dispersibility. The O/C ratio and N/C ratio can be measured by X-ray photoelectron spectroscopy (XPS).

In the present invention, the method of preparing graphene may be as described below, but is not limited thereto. In the course of preparing the above-mentioned modified graphene, the amount of the surface treating agent needs to be controlled between 0.01-0.5 times the mass of graphite oxide. In order to ensure that the surface treating agent can exert its effect, certain functional groups grow on the graphene surface to produce sufficient bonding and dispersion effects, and the amount of the surface treating agent needs to be 0.01 times or more of the treated graphite oxide. If the surface treating agent is used excessively, it will cause excessive grafting of functional groups, which will enable the graphene subjected to surface treatment to have a tendency to crosslink, self-agglomerate, and affect the dispersion effect. Meanwhile, excessive functional groups will increase the resistance of the graphene, thereby affecting the conductivity, and further affecting the utilization rate of zinc powder. From the economic point of view and the ease of post-treatment, it is not advisable to use too much surface treating agent. After experimental review, the amount of the surface treating agent is finally limited within 0.5 times the mass of the graphite oxide. The amount of the surface treating agent can finally be characterized by an atomic ratio measured by X-ray photoelectron spectroscopy (XPS).

In the present invention, the graphene anti-corrosion coating may be prepared by directly adding modified graphene slurry, or adding modified graphene powder and the corresponding dispersant. As a method for preparing the aforementioned graphene anti-corrosion coating, it is preferable to directly add the modified graphene slurry. This is because the modified graphene in the slurry is already in a well-dispersed state compared with the powder, and has very good compatibility with epoxy resin in the coating. Therefore, this addition method is more conducive to the dispersion of the modified graphene in an epoxy resin substrate than the addition of the powder, and it is not prone to agglomeration that may occur in the epoxy resin substrate when the powder is added. Meanwhile, the overall performance of the coating system is prevented from being damaged by too much introduction of the dispersant when the powder is added. Therefore, the high-performance graphene anti-corrosion coating can be obtained more easily by adding the graphene slurry.

<Curing Agent>

In the present invention, in addition to the above-mentioned epoxy resin and modified graphene, a curing agent may be contained. The curing agent is not particularly limited, as long as it is a curing agent commonly used in anti-corrosion coatings. Specifically, one or more of an amine curing agent, an acid anhydride curing agent, a resin curing agent, and an imidazole curing agent may be selected.

<Solvent>

In the present invention, one or more of toluene, xylene, trimethylbenzene, n-butanol, and water may be enumerated as a solvent used for the coating.

<Other Additives>

The graphene anti-corrosion coating of the present invention may also contain other additives. A dispersant, a defoamer, a wetting agent, an anti-flash rust agent, a thickener, a thixotropic agent, etc., may be enumerated as other additives, and these additives may be used alone or in combination of two or more.

The present invention overcomes the problem that graphene itself is prone to agglomeration due to its high specific surface. By using the surface treating agent to modify the graphene so that it has good dispersity in the substrate, the agglomeration of the graphene is avoided, thereby achieving a high barrier effect. The improvement of the barrier performance can be directly reflected in an oxygen transmission rate of a paint film of the coating. The better the barrier performance, the lower the oxygen transmission rate of the paint film. The oxygen transmission rate of the paint film of the graphene coating of the present invention can reach 0.35 g/m²·h or less. The film thickness of the graphene coating in the present invention refers to the thickness of the coating which is sprayed on the substrate and dried. In order to characterize the dispersion effect of graphene in the coating, a glossiness test is used as a characterization method to indirectly reflect the dispersity of the graphene in the coating. If the graphene is well dispersed in the coating, graphene sheets will be distributed evenly and light is rarely reflected on the coating, so the glossiness will be very low. The glossiness of the paint film of the graphene coating of the present invention can reach 3 degrees or less.

The present invention proposes a graphene anti-corrosion coating. By performing surface treatment on graphene, a chemical bonding force is introduced between the graphene and epoxy resin, and the dispersity of the modified graphene in the epoxy resin as a coating substrate is improved by using a binding force between the modified graphene and the epoxy resin. According to the present invention, the high-performance graphene anti-corrosion coating can be obtained through simple steps at a low cost, such that application prospect is more definite. The anti-corrosion coating can be widely applied in many occasions such as ships, containers, and oil tanks. The graphene coating prepared by the method has low cost and superior conductivity, and can also be applied to fields such as anti-static.

DETAILED DESCRIPTION OF EMBODIMENTS OF THE INVENTION

The present invention will be further described by the following Embodiments, but these embodiments are only for illustration and are not intended to define the scope of the present invention.

1. Raw Materials (1) Epoxy Resin

One or more of epoxy resins E-51, E-44, E-20, E-12, E-06 is/are used as a substrate of a coating.

(2) Modified Graphene

In the present invention, the method of preparing graphene may be as described below, but is not limited thereto. The modified graphene used in the present invention can be obtained by surface treatment of graphene obtained by a chemical reduction method. The commonly used graphene is mainly divided into three categories: CVD graphene, physically exfoliated graphene, and chemically exfoliated graphene. The CVD graphene may be made into a single layer, but there are no functional groups on the surface. Therefore, it is difficult to perform surface treatment, resulting in poor dispersity. Meanwhile, the CVD graphene is not suitable for large-scale applications because of high cost. The physically exfoliated graphene is simple in preparation method, but is difficult to be thin, and has the properties close to natural graphite. The surface of chemically exfoliated graphene contains functional groups, may be subjected to surface treatment as required, and may also be made to be very thin. Therefore, the chemically exfoliated graphene is selected in this experiment. Graphite oxide as a raw material is self-made from natural graphite by Hummers method. The natural graphite was purchased from Qingdao Haida Graphite Co., Ltd., and the model is LC-180. The thickness of graphite oxide is finely adjusted by controlling the addition amount of an oxidant during the oxidation process; and the diameter and size distribution of the graphite oxide are adjusted by the micronization treatment at the later stage of the reaction. The micronization processing here refers to ultrasounds and various processing methods with micronization processing functions. The resulting graphite oxide is treated with a surface treating agent, and the surface treatment is carried out at normal temperature and normal pressure. After 3 hours of reaction, modified graphite oxide is obtained. A reducing agent is used to reduce the modified graphite oxide to obtain modified graphene (slurry, a concentration of 2%), the reduction is carried out at normal temperature and pressure, and the reaction time is 1.5 hours.

Different surface treating agents and reducing agents are used to obtain modified graphene with different parameters, and the performances are shown in Table 1 below. D50/D90 is measured by a volume reference mode of particle size distribution test, the thickness is measured by an atomic force microscope (AFM), and an O/C ratio and a N/C ratio are measured by X-ray photoelectron spectroscopy (XPS).

TABLE 1

| | List of modified graphene (slurry, a concentration of 2%) | | | | | | |
|---|---|---|---|---|---|---|---|
| No. | Size D50 (μm) | Thickness (nm) | D90/ D50 | O/C ratio | N/C ratio | Surface treating agent | Reducing agent |
| 1 | 5 | 5 | 1.3 | 0.1 | 0.015 | Dipyrazolone | Hydrazine hydrate |

TABLE 1-continued

List of modified graphene (slurry, a concentration of 2%)

| No. | Size D50 (μm) | Thickness (nm) | D90/D50 | O/C ratio | N/C ratio | Surface treating agent | Reducing agent |
|---|---|---|---|---|---|---|---|
| 2 | 20 | 10 | 1.1 | 0.1 | 0.015 | 2-phenylethylamine hydrochloride | Hydroiodic acid vapor |
| 3 | 10 | 3 | 1.4 | 0.1 | 0.015 | 4,4'-Diaminodiphenylmethane | Sodium dithionite |
| 4 | 30 | 12 | 1.5 | 0.1 | 0.015 | Dopamine hydrochloride | Thermal reduction |
| 5 | 15 | 9 | 1.3 | 0.1 | 0.015 | Bis (3-methyl-1-phenyl-5-pyrazolone) | Sodium dithionite |
| 6 | 1 | 3 | 1.3 | 0.1 | 0.015 | 3-(2,3-Glyoxypropoxy)propyltrimethoxy silane (KH-560) | Sodium dithionite |
| 7 | 1 | 3 | 1.3 | 0.1 | 0.015 | 2-Aminobenzylamine | Sodium dithionite |
| 8 | 1 | 3 | 1.3 | 0.04 | 0.015 | 2-Aminobenzylamine | Sodium dithionite |
| 9 | 1 | 3 | 1.3 | 0.17 | 0.015 | 2-Aminobenzylamine | Sodium dithionite |
| 10 | 1 | 3 | 1.3 | 0.19 | 0.015 | 2-Aminobenzylamine | Sodium dithionite |
| 11 | 1 | 3 | 1.3 | 0.25 | 0.015 | 2-Aminobenzylamine | Sodium dithionite |
| 12 | 1 | 3 | 1.3 | 0.4 | 0.015 | 2-Aminobenzylamine | Sodium dithionite |
| 13 | 1 | 3 | 1.3 | 0.5 | 0.015 | 2-Aminobenzylamine | Sodium dithionite |
| 14 | 1 | 3 | 1.3 | 0.1 | 0.005 | 2-Aminobenzylamine | Sodium dithionite |
| 15 | 1 | 3 | 1.3 | 0.1 | 0.01 | 2-Aminobenzylamine | Sodium dithionite |
| 16 | 1 | 3 | 1.3 | 0.1 | 0.03 | 2-Aminobenzylamine | Sodium dithionite |
| 17 | 1 | 3 | 1.3 | 0.1 | 0.05 | 2-Aminobenzylamine | Sodium dithionite |
| 18 | 1 | 3 | 1.3 | 0.1 | 0.07 | 2-Aminobenzylamine | Sodium dithionite |
| 19 | 1 | 3 | 1.3 | 0.1 | 0.16 | 2-Aminobenzylamine | Sodium dithionite |
| 20 | 1 | 1.5 | 1.3 | 0.1 | 0.015 | 2-Aminobenzylamine | Sodium dithionite |
| 21 | 1 | 2 | 1.3 | 0.1 | 0.015 | 2-Aminobenzylamine | Sodium dithionite |
| 22 | 1 | 5 | 1.3 | 0.1 | 0.015 | 2-Aminobenzylamine | Sodium dithionite |
| 23 | 1 | 10 | 1.3 | 0.1 | 0.015 | 2-Aminobenzylamine | Sodium dithionite |
| 24 | 1 | 12 | 1.3 | 0.1 | 0.015 | 2-Aminobenzylamine | Sodium dithionite |
| 25 | 1 | 15 | 1.3 | 0.1 | 0.015 | 2-Aminobenzylamine | Sodium dithionite |

2-Aminobenzylamine: Sinopharm Chemical Reagent Co., Ltd., used directly.

Bispyrazolone: Sinopharm Chemical Reagent Co., Ltd., used directly.

Dopamine hydrochloride: Sinopharm Chemical Reagent Co., Ltd., used directly.

2-phenylethylamine hydrochloride: Sinopharm Chemical Reagent Co., Ltd., used directly.

4,4'-Diaminodiphenylmethane: Shanghai Aladdin Reagent Co., Ltd., used directly.

Bis(3-methyl-1-phenyl-5-pyrazolone): Shanghai Aladdin Reagent Co., Ltd., used directly.

3-(2,3-Glyoxypropoxy)propyltrimethoxysilane (KH-560): Shanghai Aladdin Reagent Co., Ltd., used directly.

(3) Reducing Agent

Sodium dithionite: Sinopharm Chemical Reagent Co., Ltd., used directly.

Hydrazine hydrate: Sinopharm Chemical Reagent Co., Ltd., used directly.

Hydroiodic acid: Sinopharm Chemical Reagent Co., Ltd., used directly.

(4) Other additives: bentonite, barite, iron oxide red, zinc powder, Sinopharm Chemical Reagent Co., Ltd., used directly; a dispersant (silicate dispersant: DISPERBYK-103), a defoamer (organosilicone defoamer: BYK-015), a wetting agent (polyester modified organosilicone wetting agent: DISPERBYK-142), an anti-flash rust agent (organic zinc chelate anti-flash rust agent: FA-179), all purchased from Kunshan Daiquan Fine Chemical & Technology Co., Ltd., used directly.

2. Measuring Methods of Related Properties in the Embodiments and Comparative Examples of the Present Invention are as Follows:

A. Content of graphene in a graphene anti-corrosion coating: calculated by the following formula:

$$\frac{\text{content of graphene}}{\text{in coating}} = \frac{\text{addition amount of graphene in coating}}{\text{total mass of coating solid}} \times 100\%$$

B. Thickness of a graphene coating layer: paint film thickness gauge (TIME TT220, China)

Test method: after the thickness gauge is reset to zero, a dried paint film sample is put under a probe of an instrument for measurement. Different areas on the paint film sample are selected to be measured for 10 times, and an average value is then taken.

C. Bond energy binding: infrared spectrum analysis (SHIMADZU AIM-9000, Japan)

Test method: a Fourier transform infrared spectrometer is used to test the dried coating, and whether functional groups and chemical bonds appear or disappear are determined according to characteristic absorption peaks in an infrared spectrum.

D. Flexibility: bending tester (LEPU FA-YZQ-II, China)

Test method: the coating is applied on a steel plate; after a paint film is dried, the bending tester is opened completely, shaft rods of different diameters are selected and inserted into a sample plate, so that the coating faces a seat plate. The instrument is closed at a steady speed within 1-2 s, and a test plate is bent by 1800 around the axis. The flexibility of the paint film is expressed by the smallest shaft rod diameter that does not cause the paint film to crack.

E. Impact resistance: impact tester (DALAI QCJ-120, China)

Test method: the dried paint film is placed under the impact tester, a heavy hammer drops with a fixed mass on the test board, and the impact resistance of the paint film is expressed by the maximum height that does not cause damage to the paint film.

F. Resistivity: Resistivity tester (DESCO EMI19787, USA)

Test method: the coating is applied onto an insulator material (such as PET), and after the coating is dried into a paint film, the surface resistance of the coating is tested by the resistivity tester.

G. Glossiness: glossiness meter (SPEEDRE SDR600, China)

Test method: the glossiness of the coating is measured based on the surface reflection of light relative to a polished glass reference standard. The amount of light reflected on the surface depends on the angle of incidence and the properties of the surface. The glossiness is classified as matte, semi-gloss or high gloss. In order to determine the most suitable measurement angle, the measurement starts with a glossiness meter set at an incident angle of 90°. If the test result is 10-70, the coating layer is called a "semi-gloss" coating layer and should be measured at an angle of 60°. If the test result is less than 10, the product is called a "low-gloss" product and should be measured at an angle of 85°. If the test result is larger than 70, the product is called a "high-gloss" product and should be measured at an angle of 20°.

H. Oxygen transmission rate: gas penetration tester (Labthink CLASSIC 216, China)

Test method: the coating is made into a film, and the gas permeability test is performed on the gas penetration tester by using a differential pressure method according to the JIS K7126-A standard. The coating film to be tested is fixed in the middle of a test chamber to divide the chamber into an upper chamber and a lower chamber with a constant pressure difference between them. Gas molecules will penetrate the sample from the high-pressure chamber into the low-pressure chamber, the change in pressure in the low-pressure chamber is then monitored, and the gas transmission rate is calculated by the system.

I. Salt spray resistance: neutral salt spray test box (HAIDA HD-E808-120, China)

Test method: the coating is applied to the steel plate that has been sandblasted, according to the national standard GB/T 1771-2007; and after the coating is dried, the surface is scratched and continuously tested in the neutral salt spray test box. The salt spray resistance of the coating is indicated by a time when the coating blisters and peels off, or the scratch or rust exceed 2 mm.

Embodiment 1

13 g of curing agent is weighed, added with 20 g of water, 0.1 g of wetting agent and 0.2 g of dispersant, and then stirred;

after stirring for 20 minutes, 0.1 g of dispersant, 0.1 g of defoamer, and 0.3 g of bentonite are added to the system, and continuously stirred for 15 minutes;

7 g of talcum powder is added, stirred for 5 minutes, added with 4 g of barite, 7 g of iron oxide red and 0.2 g of defoamer, and then stirred for 15 minutes.

0.2 g of anti-flash rust agent is added, stirred and dispersed for 15 minutes.

0.03 g of modified graphene is added and dispersed for 20 minutes;

215.2 g of zinc powder and 40 g of water are added to ensure the wetting of the system;

60 g of epoxy resin is added and dispersed for 15 minutes.

In order to ensure the dispersity, a homogenizer is used to disperse for 10 minutes to obtain a graphene anti-corrosion coating.

After the system is filtered with a 200-mesh filter screen, the finished coating is sprayed on a sandblasted steel plate, and various performances of the coating are then tested. The specific performances are shown in Table 2-1.

Comparative Example 1

Except that the modified graphene is not added, the same operations as in Embodiment 1 are performed to obtain the graphene anti-corrosion coating shown in Table 2-1.

Comparative Example 2

In addition to changing the modified graphene to graphene without surface treatment, the same operations as in Embodiment 1 are performed to obtain the graphene anti-corrosion coating shown in Table 2-1.

Embodiments 2-6, Comparative Examples 3-5

The content of the modified graphene of the coating in Embodiment 1 is changed as shown in Table 2-1 and Table 2-2, and the same operations as in Embodiment 1 are performed to obtain the graphene anti-corrosion coatings shown in Table 2-1 and Table 2-2.

Embodiments 7-24

Except that the content of the modified graphene in Embodiment 1 is changed as shown in Table 3-1, Table 3-2 and Table 3-3, the same operations as in Embodiment 1 are performed to obtain the graphene anti-corrosion coatings shown in Table 3-1, Table 3-2 and Table 3-3.

Embodiments 25-30

Except that the content of the modified graphene in Embodiment 1 is changed as shown in Table 4, the same operations as in Embodiment 1 are performed to obtain the graphene anti-corrosion coating shown in Table 4.

TABLE 2-1

|  | Embodiment 1 | Comparative example 1 | Comparative example 2 | Comparative example 3 | Embodiment 2 | Embodiment 3 |
|---|---|---|---|---|---|---|
| Modified graphene (No.) | 7 | None | None | 7 | 7 | 7 |
| Surface treating agent | 2-Aminobenzylamine | / / | / / | 2-Aminobenzylamine | 2-Aminobenzylamine | 2-Aminobenzylamine |
| O/C ratio | 0.1 |  | 0.1 | 0.1 | 0.1 | 0.1 |
| N/C ratio | 0.015 |  | 0 | 0.015 | 0.015 | 0.015 |
| Sheet diameter D50 ($\mu$m) | 1 |  | 1 | 1 | 1 | 1 |
| Thickness (nm) | 3 |  | 3 | 3 | 3 | 3 |
| Epoxy resin | E-44 | E-44 | E-44 | E-44 | E-44 | E-44 |
| Addition amount of graphene (wt %) | 0.01 | 0 | 0.01 | 0.008 | 0.02 | 0.03 |
| Thickness of paint film of coating ($\mu$m) | 60 | 60 | 60 | 60 | 60 | 60 |
| Addition amount of zinc powder (wt %) | 70 | 70 | 70 | 70 | 70 | 70 |
| C-N bonding interaction | Yes | No | No | Yes | Yes | Yes |
| Characteristic peaks appearing at 1000-1300 $cm^{-1}$ in infrared spectrum | Yes | No | No | Yes | Yes | Yes |
| Toughness of paint film (mm) | 1 | 2 | 2 | 1 | 1 | 1 |
| Impact resistance of paint film (kg · cm) | 75 | 50 | 55 | 65 | 75 | 75 |
| Resistivity ($\Omega$m) | $3 \times 10^6$ | $1 \times 10^{11}$ | $1 \times 10^{10}$ | $1 \times 10^7$ | $1 \times 10^6$ | $7 \times 10^5$ |
| Glossiness | 1.3 | 40 | 23 | 6.3 | 1.1 | 1 |
| Oxygen transmission rate (g/m² · h) | 0.35 | 7.37 | 5.22 | 4.48 | 0.29 | 0.27 |
| Salt spray resistance time (h) | 2590 | 780 | 900 | 1320 | 2600 | 2650 |

TABLE 2-2

|  | Embodiment 4 | Embodiment 5 | Embodiment 6 | Comparative example 4 | Comparative example 5 |
| --- | --- | --- | --- | --- | --- |
| Modified graphene (No.) | 7 | 7 | 7 | 7 | 7 |
| Surface treating agent | 2-Aminobenzylamine | 2-Aminobenzylamine | 2-Aminobenzylamine | 2-Aminobenzylamine | 2-Aminobenzylamine |
| O/C ratio | 0.1 | 0.1 | 0.1 | 0.1 | 0.1 |
| N/C ratio | 0.015 | 0.015 | 0 | 0.015 | 0.015 |
| Sheet diameter D50 (μm) | 1 | 1 | 1 | 1 | 1 |
| Epoxy resin | E-44 | E-44 | E-44 | E-44 | E-44 |
| Thickness (nm) | 3 | 3 | 3 | 3 | 3 |
| Addition amount of graphene (wt %) | 0.05 | 0.1 | 0.2 | 0.5 | 1 |
| Thickness of paint film of coating (μm) | 60 | 60 | 60 | 60 | 60 |
| Addition amount of zinc powder (wt %) | 70 | 70 | 70 | 70 | 70 |
| C—N bonding interaction | Yes | Yes | Yes | Yes | Yes |
| Characteristic peaks appearing at 1000-1300 $cm^{-1}$ in infrared spectrum | Yes | Yes | Yes | Yes | Yes |
| Toughness of paint film (mm) | 1 | 1 | 1 | 1 | 2 |
| Impact resistance of paint film (kg · cm) | 75 | 70 | 70 | 50 | 40 |
| Resistivity (Ωm) | $2 \times 10^5$ | $1 \times 10^5$ | $6 \times 10^4$ | $2 \times 10^4$ | $5 \times 10^3$ |
| Glossiness | 0.5 | 4.3 | 6.6 | 18 | 27 |
| Oxygen transmission rate (g/m² · h) | 0.12 | 3.01 | 3.75 | 10.44 | 102.54 |
| Salt spray resistance time (h) | 2960 | 1630 | 1460 | 660 | 100 |

As shown in Table 2-1 and Table 2-2, it can be seen in combination with Embodiments 1-6 and Comparative Examples 1-5 that within a certain range, the addition of the modified graphene can greatly improve the performances of the coating. If this range is exceeded, the graphene content is too high, such that the graphene is prone to agglomeration, which reduces the dispersity of the graphene in the coating. At this time, the agglomeration may cause local defects in the coating, so the large amount of graphene will reduce the performances of the coating. When modified graphene is added to the coating, the impact resistance and toughness are promoted, combination bonds are formed, the oxygen transmission rate and glossiness decrease, and the salt spray resistance time increases, that is, the overall performance is improved.

TABLE 3-1

|  | Embodiment 7 | Embodiment 8 | Embodiment 9 | Embodiment 10 | Embodiment 11 | Embodiment 12 |
| --- | --- | --- | --- | --- | --- | --- |
| Modified graphene (No.) | 8 | 9 | 10 | 11 | 12 | 13 |
| Surface treating agent | 2-Aminobenzylamine | 2-Aminobenzylamine | 2-Aminobenzylamine | 2-Aminobenzylamine | 2-Aminobenzylamine | 2-Aminobenzylamine |
| O/C ratio | 0.04 | 0.11 | 0.19 | 0.25 | 0.4 | 0.5 |
| N/C ratio | 0.015 | 0.015 | 0.015 | 0.015 | 0.015 | 0.015 |
| Sheet diameter D50 (μm) | 1 | 1 | 1 | 1 | 1 | 1 |
| Thickness (nm) | 3 | 3 | 3 | 3 | 3 | 3 |
| Epoxy resin | E-44 | E-44 | E-44 | E-44 | E-44 | E-44 |
| Addition amount of graphene (wt %) | 0.01 | 0.01 | 0.01 | 0.01 | 0.01 | 0.01 |
| Thickness of paint film of coating (μm) | 60 | 60 | 60 | 60 | 60 | 60 |
| Addition amount of zinc powder (wt %) | 70 | 70 | 70 | 70 | 70 | 70 |
| C-N bonding interaction | Yes | Yes | Yes | Yes | Yes | Yes |
| Characteristic peaks appearing at 1000-1300 $cm^{-1}$ in infrared spectrum | Yes | Yes | Yes | Yes | Yes | Yes |
| Toughness of paint film (mm) | 1 | 1 | 1 | 1 | 1 | 1 |

TABLE 3-1-continued

|  | Embodiment 7 | Embodiment 8 | Embodiment 9 | Embodiment 10 | Embodiment 11 | Embodiment 12 |
| --- | --- | --- | --- | --- | --- | --- |
| Impact resistance of paint film (kg · cm) | 70 | 75 | 75 | 75 | 75 | 70 |
| Resistivity ($\Omega$m) | $1 \times 10^6$ | $5 \times 10^6$ | $7 \times 10^6$ | $9 \times 10^6$ | $1 \times 10^7$ | $7 \times 10^7$ |
| Glossiness | 2.9 | 0.5 | 0.7 | 0.9 | 1.1 | 2.9 |
| Oxygen transmission rate (g/m$^2$ · h) | 1.18 | 0.15 | 0.21 | 0.23 | 0.27 | 1.26 |
| Salt spray resistance time (h) | 1900 | 2850 | 2780 | 2760 | 2660 | 1800 |

TABLE 3-2

|  | Embodiment 13 | Embodiment 14 | Embodiment 15 | Embodiment 16 | Embodiment 17 | Embodiment 18 |
| --- | --- | --- | --- | --- | --- | --- |
| Modified graphene (No.) | 14 | 15 | 16 | 17 | 18 | 19 |
| Surface treating agent | 2-Aminobenzylamine | 2-Aminobenzylamine | 2-Aminobenzylamine | 2-Aminobenzylamine | 2-Aminobenzylamine | 2-Aminobenzylamine |
| O/C ratio | 0.1 | 0.1 | 0.1 | 0.1 | 0.1 | 0.1 |
| N/C ratio | 0.005 | 0.01 | 0.03 | 0.05 | 0.07 | 0.16 |
| Sheet diameter D50 (μm) | 1 | 1 | 1 | 1 | 1 | 1 |
| Thickness (nm) | 3 | 3 | 3 | 3 | 3 | 3 |
| Epoxy resin | E-44 | E-44 | E-44 | E-44 | E-44 | E-44 |
| Addition amount of graphene (wt %) | 0.01 | 0.01 | 0.01 | 0.01 | 0.01 | 0.01 |
| Thickness of paint film of coating (μm) | 60 | 60 | 60 | 60 | 60 | 60 |
| Addition amount of zinc powder (wt %) | 70 | 70 | 70 | 70 | 70 | 70 |
| C-N bonding interaction | Yes | Yes | Yes | Yes | Yes | Yes |
| Characteristic peaks appearing at 1000-1300 cm$^{-1}$ in infrared spectrum | Yes | Yes | Yes | Yes | Yes | Yes |
| Toughness of paint film (mm) | 1 | 1 | 1 | 1 | 1 | 1 |
| Impact resistance of paint film (kg · cm) | 70 | 70 | 75 | 70 | 70 | 65 |
| Resistivity ($\Omega$m) | $8 \times 10^5$ | $2 \times 10^6$ | $6 \times 10^6$ | $7 \times 10^6$ | $9 \times 10^7$ | $7 \times 10^8$ |
| Glossiness | 2.9 | 2.1 | 0.6 | 1.7 | 3 | 5.4 |
| Oxygen transmission rate (g/m$^2$ · h) | 1.25 | 0.89 | 0.18 | 0.77 | 1.93 | 3.81 |
| Salt spray resistance time (h) | 1820 | 2200 | 2810 | 2400 | 1560 | 1420 |

TABLE 3-3

|  | Embodiment 19 | Embodiment 20 | Embodiment 21 | Embodiment 22 | Embodiment 23 | Embodiment 24 |
|---|---|---|---|---|---|---|
| Modified graphene (No.) | 20 | 21 | 22 | 23 | 24 | 25 |
| Surface treating agent | 2-Aminobenzylamine | 2-Aminobenzylamine | 2-Aminobenzylamine | 2-Aminobenzylamine | 2-Aminobenzylamine | 2-Aminobenzylamine |
| O/C ratio | 0.1 | 0.1 | 0.1 | 0.1 | 0.1 | 0.1 |
| N/C ratio | 0.015 | 0.015 | 0.015 | 0.015 | 0.015 | 0.015 |
| Sheet diameter D50 (μm) | 1 | 1 | 1 | 1 | 1 | 1 |
| Thickness (nm) | 1.5 | 2 | 5 | 10 | 12 | 15 |
| Epoxy resin | E-44 | E-44 | E-44 | E-44 | E-44 | E-44 |
| Addition amount of graphene (wt %) | 0.01 | 0.01 | 0.01 | 0.01 | 0.01 | 0.01 |
| Thickness of paint film of coating (μm) | 60 | 60 | 60 | 60 | 60 | 60 |
| Addition amount of zinc powder (wt %) | 70 | 70 | 70 | 70 | 70 | 70 |
| C-N bonding interaction | Yes | Yes | Yes | Yes | Yes | Yes |
| Characteristic peaks appearing at 1000-1300 cm$^{-1}$ in infrared spectrum | Yes | Yes | Yes | Yes | Yes | Yes |
| Toughness of paint film (mm) | 1 | 1 | 1 | 1 | 1 | 1 |
| Impact resistance of paint film (kg · cm) | 70 | 75 | 75 | 75 | 75 | 70 |
| Resistivity (Ωm) | $4 \times 10^5$ | $7 \times 10^5$ | $6 \times 10^6$ | $8 \times 10^6$ | $2 \times 10^7$ | $3 \times 10^8$ |
| Glossiness | 2.2 | 0.6 | 1.5 | 1.9 | 2.3 | 2.4 |
| Oxygen transmission rate (g/m$^2$ · h) | 0.95 | 0.16 | 0.38 | 0.54 | 0.81 | 1.03 |
| Salt spray resistance time (h) | 2130 | 2830 | 2550 | 2470 | 2250 | 2080 |

As shown in Table 2-1, Table 2-2, Table 3-1, Table 3-2, and Table 3-3, in combination with Embodiments 1, 7-12, the lower the 0/C ratio within a certain range, the higher the conductivity of the modified graphene, and the higher the overall conductivity of the coating, which facilitates increasing the utilization rate of zinc powder and prolonging the anti-corrosion time. In combination with Embodiments 1, 13-18, it can be seen that within a certain range, the N/C ratio is high, which indicates that a grafting rate of the surface treating agent is relatively high, the dispersity of the graphene will be relatively better, and the overall performance of the graphene coating is also relatively good.

TABLE 4

|  | Embodiment 25 | Embodiment 26 | Embodiment 27 | Embodiment 28 | Embodiment 29 | Embodiment 30 |
|---|---|---|---|---|---|---|
| Modified graphene (No.) | 1 | 2 | 3 | 4 | 5 | 6 |
| Surface treating agent | Dipyrazolone | 2-phenylethylamine hydrochloride | 4,4'-Diaminodiphenylmethane | Dopamine hydrochloride | Bis (3-methyl-1-phenyl-5-pyrazolone) | 3-(2,3-Glyoxypropoxy) propyltrimethoxysilane (KH-560) |
| O/C ratio | 0.1 | 0.1 | 0.1 | 0.1 | 0.1 | 0.1 |
| N/C ratio | 0.015 | 0 | 0.015 | 0.015 | 0.015 | 0 |
| Sheet diameter D50 (μm) | 5 | 20 | 10 | 30 | 15 | 1 |
| Thickness (nm) | 5 | 10 | 3 | 12 | 9 | 3 |
| Epoxy resin | E-44 | E-20 | E-51 | E-12 | E-06 | E-51 |
| Addition amount of graphene (wt %) | 0.01 | 0.01 | 0.01 | 0.01 | 0.01 | 0.01 |

TABLE 4-continued

|  | Embodiment 25 | Embodiment 26 | Embodiment 27 | Embodiment 28 | Embodiment 29 | Embodiment 30 |
|---|---|---|---|---|---|---|
| Thickness of paint film of coating (μm) | 60 | 60 | 60 | 60 | 60 | 60 |
| Addition amount of zinc powder (wt %) | 70 | 70 | 70 | 70 | 70 | 70 |
| C-N bonding interaction | Yes | Yes | Yes | Yes | Yes | No |
| Characteristic peaks appearing at 1000-1300 cm$^{-1}$ in infrared spectrum | Yes | Yes | Yes | Yes | Yes | No |
| Toughness of paint film (mm) | 1 | 1 | 1 | 1 | 1 | 1 |
| Impact resistance of paint film (kg · cm) | 70 | 75 | 75 | 70 | 70 | 65 |
| Resistivity (Ωm) | $3 \times 10^6$ | $7 \times 10^6$ | $8 \times 10^6$ | $2 \times 10^7$ | $9 \times 10^6$ | $3 \times 10^8$ |
| Glossiness | 2.4 | 2.1 | 1 | 2.3 | 2.7 | 4.2 |
| Oxygen transmission rate (g/m$^2$ · h) | 0.84 | 0.74 | 0.24 | 0.8 | 1.06 | 3.21 |
| Salt spray resistance time (h) | 2300 | 2430 | 2700 | 2360 | 2050 | 1490 |

As shown in Table 2-1, Table 2-2 and Table 4, in combination with Embodiments 1, 25-30 and Comparative Example 2, arylaminos, pyrazolones, and catechols are used as the surface treating agents to treat graphene oxides with different physical parameters, and modified graphene obtained by reduction by means of different methods can improve the performances of the coating, and the improvement effect is more obvious than that of graphene without surface treatment.

The invention claimed is:

1. A graphene anti-corrosion coating, comprising an epoxy resin and graphene, wherein the graphene is modified by a surface treating agent, and the addition of the amount of graphene is 0.01-0.2 wt % of the total mass of coating solid, wherein an atomic ratio of oxygen element to carbon element (O/C ratio) in the graphene is 0.05-0.40, the surface treating agent is one or more of [arylaminos, pyrozolones, and catechols] 2-aminobenzylamine, 2-phenethylamine hydrochloride, 4,4'-diaminodiphenylmethane, bispyrazolone, and dopamine hydrochloride and wherein the graphene anti-corrosion coating further contains zinc powder.

2. The graphene anti-corrosion coating according to claim 1, wherein the addition amount of the graphene is 0.01-0.05 wt % of the total mass of the coating solid.

3. The graphene anti-corrosion coating according to claim 1, wherein an atomic ratio of nitrogen element to carbon element (N/C ratio) in the graphene is 0.01-0.05.

4. The graphene anti-corrosion coating according to claim 1, wherein the thickness of the graphene is 2-12 nm.

5. The graphene anti-corrosion coating according to claim 1, wherein the surface treating agent further comprises [is one or more selected from the group consisting of] p-chloroaniline, p-chloroaniline, o-toluidine, acetanilide, [2-aminobenzylamine] p-methoxyaniline, 2-nitroaniline, [2-phenylethylamine hydrochloride, 4,4'-diaminodiphenylmethane,] 1-phenyl-3-methyl-4-benzoyl-5-pyrazolone, [bispyrazolone, ] picric acid, 1-phenyl-3-methyl-5-pyrazolone, catechol borane, pyrocatechol violet, 3,5-di-tert-butyl-1,2-benzenediol, and 4-nitrocatechol[, and dopamine hydrochloride].

6. The graphene anti-corrosion coating according to claim 1, wherein the glossiness of a paint film of the coating is 3 or less.

7. The graphene anti-corrosion coating according to claim 1, wherein the oxygen transmission rate of the paint film of the coating is 0.35 g/m$^2$·h or less.

8. The graphene anti-corrosion coating according to claim 1, wherein the graphene anti-corrosion coating further contains one or more of toluene, xylene, trimethylbenzene, n-butanol, and water.

* * * * *

UNITED STATES PATENT AND TRADEMARK OFFICE
CERTIFICATE OF CORRECTION

PATENT NO. : 12,024,648 B2
APPLICATION NO. : 17/292745
DATED : July 2, 2024
INVENTOR(S) : Ke Wang et al.

Page 1 of 1

It is certified that error appears in the above-identified patent and that said Letters Patent is hereby corrected as shown below:

In the Claims

Column 19, Lines 49-50, Claim 1: after "of", delete "[arylaminos, pyrozolones, and catechols]"

Column 20, Lines 36-38 (approx.), Claim 5: after "comprises", delete "[is one or more selected from the group consisting of]"

Column 20, Lines 38-39, Claim 5: after "acetanilide,", delete "[2-aminobenzylamine]"

Column 20, Lines 39-40, Claim 5: after "2-nitroaniline,", delete "[2-phenylethylamine hydrochloride, 4,4′-diaminodiphenylmethane,]"

Column 20, Lines 41-42, Claim 5: after "1-phenyl-3-methyl-4-benzoyl-5-pyrazolone,", delete "[bispyrazolone, ]"

Column 20, Lines 44-45, Claim 5: after "4-nitrocatechol", delete "[, and dopamine hydrochloride]"

Signed and Sealed this
Twenty-fourth Day of September, 2024

Katherine Kelly Vidal
*Director of the United States Patent and Trademark Office*